United States Patent
Felegi, Jr. et al.

(10) Patent No.: US 6,919,132 B2
(45) Date of Patent: Jul. 19, 2005

(54) FIBERBOARD PANEL HAVING IMPROVED ACOUSTICS AND DURABILITY

(75) Inventors: John Felegi, Jr., Lancaster, PA (US); Robert C. Garman, Millersville, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 10/636,405

(22) Filed: Aug. 7, 2003

(65) Prior Publication Data

US 2005/0031842 A1 Feb. 10, 2005

(51) Int. Cl.$^7$ ................................................. D02G 3/00
(52) U.S. Cl. ....................... 428/372; 428/222; 428/369; 428/364; 162/152
(58) Field of Search .................. 428/114, 219, 428/222, 332, 364, 369, 372; 162/145, 152, 168.3, 204

(56) References Cited

U.S. PATENT DOCUMENTS

| | | | | |
|---|---|---|---|---|
| 4,911,788 A | * | 3/1990 | Pittman et al. | 162/145 |
| 5,071,511 A | * | 12/1991 | Pittman | 162/145 |
| 5,250,153 A | * | 10/1993 | Izard et al. | 162/152 |

* cited by examiner

Primary Examiner—Merrick Dixon

(57) ABSTRACT

A fine texture fiberboard panel having a low resistivity value and a high board hardness value. The panel includes mineral fibers, perlite, cellulosic fibers, and binder. The mineral fibers comprise from about 50% to about 85%, the perlite includes from 0% to about 18%, the cellulosic fiber comprises from about 2% to about 7% and the binder includes from about 6% to about 15% of the panel on a dry solids weight basis. The concentration of mineral fibers includes from about 30% to about 65% nodulated mineral fiber. The perlite has a density in the range from about 7 to about 20 pcf.

5 Claims, No Drawings

FIBERBOARD PANEL HAVING IMPROVED ACOUSTICS AND DURABILITY

FIELD OF THE INVENTION

The present invention relates to the field of fiberboard panels. More particularly, the invention relates to fiberboard panel formulations which can be fabricated into durable acoustical panels having a fine textured appearance using a wet-felting process.

BACKGROUND

Fiberboard panels can provide aesthetic appeal, acoustical modification or dampening, accessibility to space above the ceiling plane, and simple installation and removal. To accommodate these features at a relatively low cost, panels are constructed using strong but relatively inexpensive panel-forming materials, such as mineral fiber, cellulosic fiber, perlite and binder.

Two of several fiberboard performance properties sought to be optimized are acoustical resistivity and board hardness. Those skilled in the art will appreciate that most conventional attempts to optimize one or both of these performance properties, including modifying the formulation of the panel and/or the process for producing the panel, resulted in improved performance of one characteristic and a reduction in the performance of the other.

The wet-felting process is a known process for fabricating acoustical panels. In the wet-felting process, an aqueous slurry of the panel-forming materials is deposited onto a moving wire screen, such as a fourdrinier or cylinder former. On the wire screen of a fourdrinier, a wet mat is formed by dewatering the aqueous slurry by gravity and then optionally by vacuum suction. The wet mat is pressed to a desired thickness between press rolls and the wire screen for additional dewatering. The pressed mat is dried in ovens or kilns and then cut to produce acoustical panels. However, the combination of low level resistivity and high level board hardness has not been achieved in single layer fiberboards produced using conventional wet-felting technology.

One known way to obtain the aforementioned combination of performance properties via the wet-felting process is to use overlays having nodulated mineral fibers. Wet-formed panels having nodulated mineral fiber overlays, are described in U.S. patent application Ser. No. 09/860,271. The disadvantages of the overlay technology are the high capital cost necessary to produce and adhere the overlay and the overall increased process complexity.

The aforementioned performance properties can also be achieved in fiberboard panels using the well know cast process. In the cast process, a mixture of mineral fiber, cellulosic fiber, perlite, binder and other board-forming ingredients are deposited on trays which have been covered with paper or foil. The filled trays are typically placed in an oven in order to dry the mixture. The dried sheets are typically surface treated to obtain a desired thickness and are cut into panels. One of the disadvantages of using the cast technology to achieve the desired performance properties is the high cost to produce the panels which results from the slow production rate.

SUMMARY

The fine textured fiberboard panel of the invention exhibits a combination of performance properties, including a low resistivity value and a high board hardness value, which heretofore have not been achieved in a single layer wet-felted unpunched product.

The fiberboard panel of the invention includes mineral fibers, perlite, cellulosic fibers, and binder. The mineral fibers comprise from about 50% to about 85%, the perlite comprises from 0% to about 18%, the cellulosic fiber comprises from about 2% to about 7% and the binder comprises from about 6% to about 15% of the panel on a dry solids weight basis. The concentration of mineral fibers includes from about 30% to about 65% nodulated mineral fiber. The perlite has a density in the range from about 7 to about 20 pcf. The resulting performance properties of the board include a resistivity value in the range from about 200,000 to about 400,000 mks rayls/m and a hardness value in the range from about 85 to about 130 lbf.

DETAILED DESCRIPTION OF THE DRAWINGS

The following description of the invention is provided as an enabling teaching of the invention in its best, currently known embodiment. Those skilled in the relevant art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the following description is provided as illustrative of the principles of the present invention and not in limitation thereof, since the scope of the present invention is defined by the claims.

It has been determined that a high mineral fiber formula with low percentages of relatively high density perlite will yield the acoustical resistivity necessary to obtain an NRC in the range from about 0.65 to about 0.75. The formulation of the fiberboard includes the following ingredients in the listed percentages by dry weight:

| Component | Range | Preferred |
|---|---|---|
| Mineral Fiber | 50%–85% | 78% |
| Starch | 6%–15% | 10% |
| Cellulose Fibers | 2%–7% | 4% |
| Filler | 0%–20% | 0% |
| Expanded Perlite | 0%–18% | 8% |

As displayed in the listing, the solids content of the slurry is from about 50% to about 85% mineral fiber. Useful mineral fibers include metal slag wool, fiberglass, rock wool and mineral wool. The formulation also contains 0% to about 18% by weight perlite particles. The perlite suitably has a density in the range from about 7 to about 20 pcf. The slurry also contains from about 2% to about 7% weight percent cellulosic fibers on a dry solids basis. Useful cellulosic fibers include secondary groundwood fibers, primary or secondary wood fibers or plant fibers. The formulation also contains a binding agent in the range from about 6% to about 15% weight percent on a dry solids basis. Numerous materials may be used as a binding agent including pearl cornstarch, wheat starch, potato starch, chemically modified starch, polystyrene, polyvinyl acetate, polystyrene acrylics and styrene butadiene. The formulation may also contain 0% to about 20% weight dry solids basis filler. Useful fillers include kaolin clay, calcium carbonate, silica, vermiculite, bentonite or ball clay, talc, mica and gypsum.

Other auxiliary additives can be added into the formulation. These substances include broke, flocculants, defoaming agents and biocides. The proper amounts of such auxiliary additives can readily be determined by those skilled in the art. For example, the formed panel can contain up to about 30%, and more preferably 25% (dry weight basis), broke. Broke is usually recycled panel or panel-forming components such as flat scrap, sander dust and edge trimmings.

Fiberboard panels made in accordance with the aforementioned material ranges of solids had the following physical properties:

| Physical Property | Range | Preferred |
| --- | --- | --- |
| Sanded Thickness (in.) | 0.700"–0.850" | 0.750" |
| Density (lb/bd ft) | 1.20–1.50 | 1.23 |
| Resistivity (mks rayls/m) | 200,000–400,000 | 240,000 |
| Hardness (lbf) | 85–130 | 99.6 |

Hardness is tested in accordance with ASTM C367-95, Sections 2–7. Resistivity is measured in accordance with ASTM Test C522-87.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

We claim:

1. A panel comprising:

mineral fibers, perlite, cellulosic fibers, and binder;

the mineral fibers comprising about 50% to about 85%, the perlite comprising 0% to about 18%, the cellulosic fiber comprising about 2% to about 7% and the binder comprising about 6% to about 15%, of a dry solids weight of said panel;

wherein from about 30% to about 65% of the mineral fibers are nodulated and the perlite has a density in the range from about 7 to about 20 pcf;

whereby a resistivity value in the range from about 200,000 to about 400,000 mks rayls/m and a hardness value in the range from about 85 to about 130 lbf is achieved in the panel.

2. The panel of claim 1, wherein the perlite has a density greater than 8.5 to about 20 pcf.

3. The panel of claim 2, wherein the perlite has a density in the range from about 9 to about 20 pcf.

4. The panel of claim 1, further comprising from 0% to about 20% mineral filler of a dry solids weight of said panel.

5. The panel of claim 1, wherein the panel has an NRC in the range about 0.65 to about 0.75.

* * * * *